United States Patent [19]

Crowe et al.

[11] 4,199,807
[45] Apr. 22, 1980

[54] REGULATED POWER SUPPLY APPARATUS

[75] Inventors: John E. Crowe; John M. Leach, both of Bishop's Stortford; Malcolm A. Burchall, Wendens Ambo, all of England

[73] Assignee: Gould Advance Limited, Mainault, England

[21] Appl. No.: 899,354

[22] Filed: Apr. 24, 1978

[51] Int. Cl.² ............................................. H02P 13/20
[52] U.S. Cl. ...................................... 363/132; 363/23; 363/98
[58] Field of Search ..................................... 363/22–26, 363/70–71, 74, 78, 80, 97–98, 86, 135–136, 132; 307/33, 34; 323/17, DIG. 1

[56]      References Cited
      U.S. PATENT DOCUMENTS

| | | | |
|---|---|---|---|
| 3,263,152 | 7/1966 | Walker | 363/139 X |
| 3,349,314 | 10/1967 | Giannamore | 363/139 |
| 3,543,139 | 11/1970 | Greene | 307/34 X |
| 4,089,049 | 5/1978 | Suzuki et al. | 363/132 X |
| 4,106,084 | 8/1978 | Gibert | 363/97 X |

Primary Examiner—J. D. Miller
Assistant Examiner—Peter S. Wong
Attorney, Agent, or Firm—Lawrence E. Laubscher

[57]      ABSTRACT

A power supply apparatus is disclosed including a device for producing an oscillatory signal, and an output circuit for producing from said oscillatory signal an alternating-current output voltage, characterized by the provision of a regulating unit connected in series with the output circuit for producing a controllable voltage drop. The regulating unit includes a control device operable in response to a signal derived from the output circuit for controlling the voltage drop in response to a change in an output parameter of the output circuit.

10 Claims, 6 Drawing Figures

REGULATED POWER SUPPLY APPARATUS

This invention relates to power supply apparatus of the converter type, in which output power is obtained by means of an oscillating circuit. The circuit is powered from the input power to be converted and an alternating output is obtained from the oscillatory current of the stage. Such units are convenient for use where it is desired to operate relatively low voltage equipment from an alternating power supply. The invention has for its object to provide converters which are improved in various respects, as will appear.

SUMMARY OF THE INVENTION

The present invention provides a power supply apparatus comprising a power source, means connected to the power source for producing an oscillatory signal, and an output circuit connected to the oscillatory signal producing means for producing an alternating output, the improvement comprising regulating means effectively connected in series with the output circuit for producing a controllable voltage drop, the regulating means being provided with control means responsive to a signal derived from the output circuit for controlling the voltage drop in response to a change in an output parameter of the output circuit.

BRIEF DESCRIPTION OF THE DRAWING

Features and advantages of the invention will appear from the following description of embodiments thereof, given by way of example, and the accompanying drawings, in which.

DETAILED DESCRIPTION

In order to provide a regulated output from a power supply of the converter type, separate regulating means must be employed since otherwise the output voltage will follow faithfully the variations and fluctuations of the input voltage.

In the embodiments to be described the regulating means comprises means effectively in series with the primary winding of an output transformer of the converter for producing a controllable voltage drop in the primary circuit of the transformer.

Figure 1:
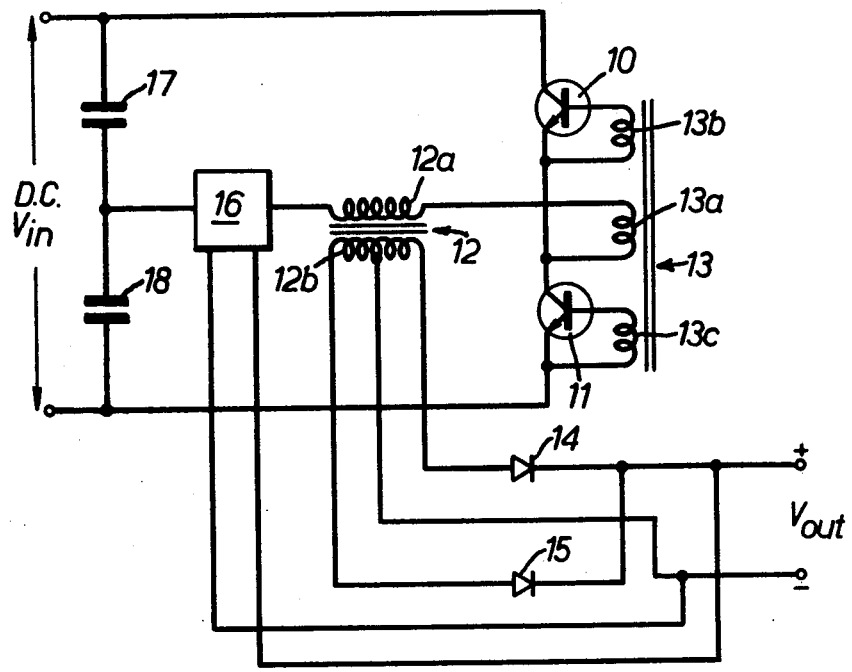
FIG. 1 shows a simplified circuit diagram of a regulated converter.

The basis of such an arrangement is shown in FIG. 1 which shows a self-oscillating inverter of the type known as a half-bridge inverter in which two transistors 10 and 11 conduct alternately and consecutively thus impressing a square wave upon the primary winding 12a of an output transformer 12. The output is taken from the secondary winding 12b of the transformer 12 via a centre tapping and diodes 14 and 15 if a D.C. output is required.

The circuit operates in the following manner; a transformer 13 has a primary winding 13a and secondary windings 13b and 13c which feed transistors 10 and 11, respectively. Winding 13a of transformer 13 is connected in series with the primary winding 12a of the transformer 12 to the junction of two capacitors 17 and 18. The secondary winding of the transformer 12 feeds a load.

In this circuit, the current load reflected into the primary winding of transformer 12, caused by the conduction of transistor 10, flows in the primary winding 13a of feedback transformer 13 in such a sense that the winding 13b maintains the transistor 10 in conduction. Feedback is thus positive. Conduction in transistor 10 is maintained until the core of transformer 13 saturates, due to the voltage time integral impressed upon winding 13 of the transformer by the constant value $V_{be}$ of transistor 10. Transistor 10 then turns off and the consequent reduction in current flowing in winding 13a of transformer 13 causes a flux reversal in the core, which induces a current in winding 13c, causing transistor 11 to turn on. This transistor is then maintained in conduction in a manner similar to 10 until it turns off due to saturation of the core of the transformer 13.

Transistors 10 and 11, transformer 12 and capacitors 17 and 18 form the basic elements of the converter as in FIG. 1. The method according to the preferred embodiment by which control of the voltage applied to the primary of transformer 12 is achieved in order to control the output voltage is as follows and is described with reference to FIG. 2. Capacitors 17 and 18, instead of each being charged to half the supply voltage, as in FIG. 1, are each charged to something less than half the supply voltage by the action of a transistor 21. This transistor is switched between its conducting and non-conducting states with a ratio of conductivity to non-conducting periods which is controlled by some external signal. This combines with the filtering action of choke 22 and capacitors 17 and 18 to produce a controlled data of charge on capacitors 17 and 18. This is the desired condition by which the voltage applied to the primary 12a of transformer 12 during the normal operation of the inverter may be held under control. Diodes 27 and 28 act as the flywheel diodes for the currents flowing in choke 22.

A switching transistor is used to produce the controlled voltage drop in order to avoid the steady-state power dissipation which would result from the use of a transistor operating in the linear mode.

Figure 2:
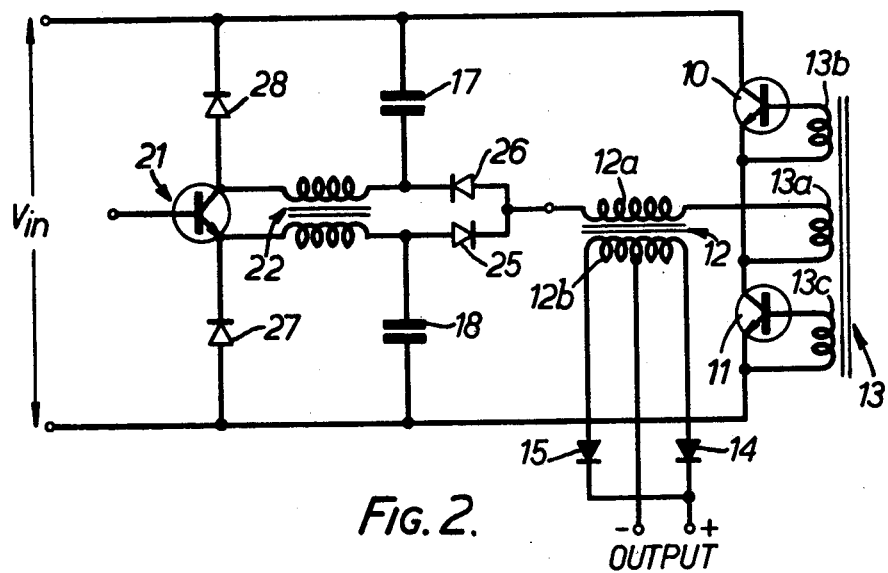
FIG. 2 shows a circuit diagram of the regulated converter with particular reference to the method by which regulation is achieved.
Figure 3:
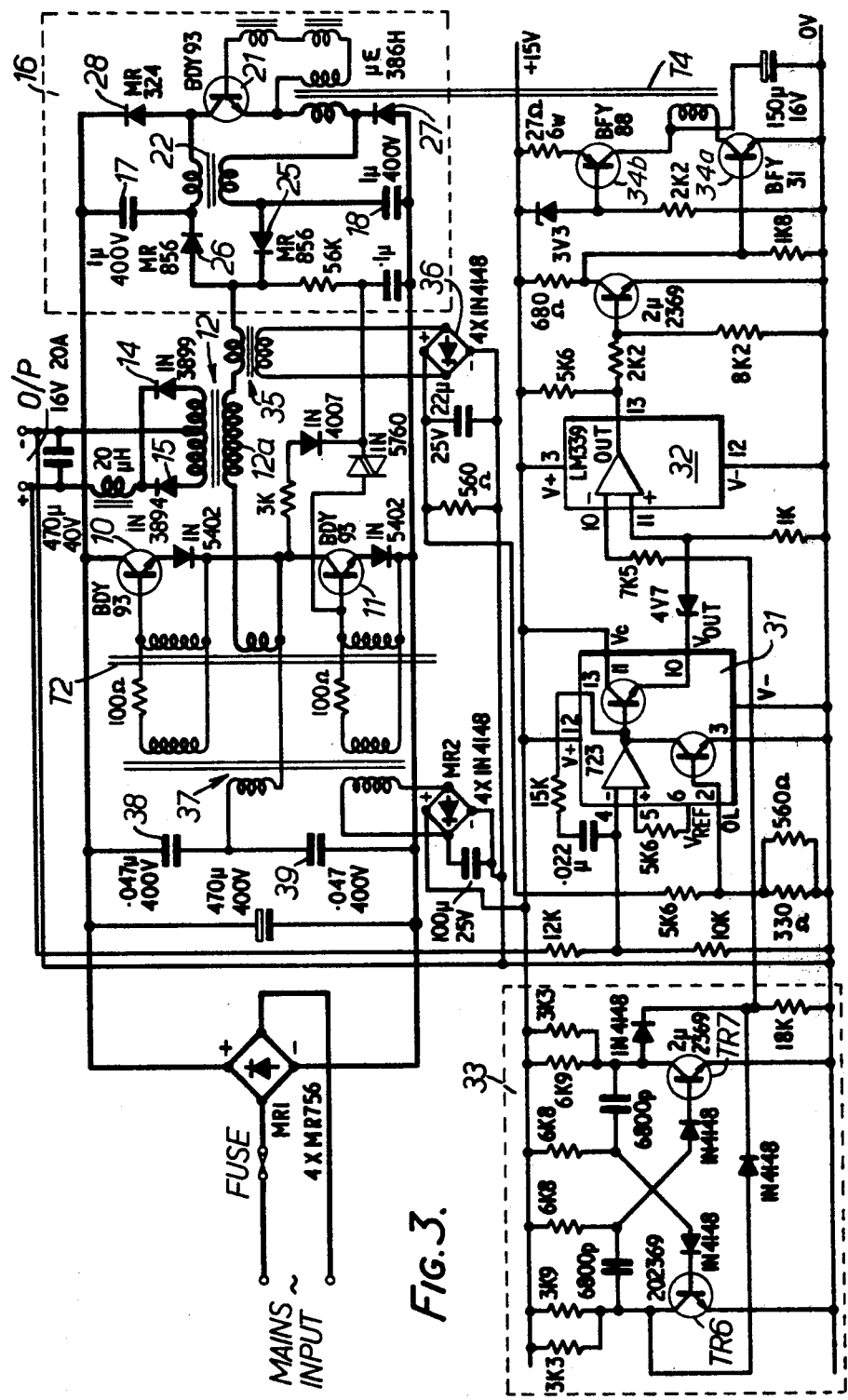
FIG. 3 shows a circuit diagram of an actual regulated converter based on the circuit shown in FIGS. 1 and 2.

For a more complete understanding, FIG. 3 shows the circuit diagram of a circuit built in accordance with the above embodiment. Since circuit values are given, it is believed that the operation of the upper half of the circuit will be understood from the description of the embodiment. Further details of the self-oscillating inverter 12a are given in our co-pending application Ser. No. 914,897 filed June 12, 1978 and the disclosure of this prior specification is incorporated herein. However, like elements in FIGS. 1, 2 and 3 are given the identical reference numeral for clarity.

In spite of this, the manner in which the switching transistor 21 of the regulating unit 16 is controlled will be explained in some detail.

The output voltage is sensed and compared with a stable reference voltage by integrated regulator 31. The error voltage output from this circuit is then compared, using a comparator 32, with timing ramps produced by a ramp generator 33. The output from this comparator 32 is a series of pulses at a fixed frequency, whose width varies according to the magnitude of the output voltage. These pulses are buffered by transistors 34a, 34b and used to switch the control transistor 21. Because the ratio of 'on' to 'off' duration of 21 controls the output voltage, closed loop control is thus achieved.

Control of the output current in conditions of overload is achieved by sensing the reflected load current flowing in the primary 12a of transformer 12 using current sensing transformer 35. The output from transformer 35 is rectified by rectifier bridge 36 and fed as a voltage to the current limit input of regulator 31 in such a manner that when a predetermined amount of load current is flowing, the voltage signal into 31 is sufficient to influence the output voltage from 31, in order to reduce the durations of the pulses appearing at the output of the comparator 32. By this means, the output voltage may be reduced in order to maintain the output current at the predetermined level regardless of the loading on the output.

The supply voltage of the control circuits is derived from the secondary winding of a transformer 37 whose primary is connected between the switching transistors 10, 11 and auxiliary splitter capacitors 38, 39 in such a manner that operation of the switching transistors 10,11 produces an a.c. waveform across the secondary irrespective of the orientation of the current and voltage control loops. This transformer is also used to provide the voltage feedback to the bases of the switching transistors 10,11 which is necessary to sustain oscillation when the normal current feedback mechanism fails under conditions of light or zero load. The embodiments described above have only one output but they can be modified to provide a plurality of outputs each of which can be independently regulated or a plurality of outputs can be regulated from one regulating unit by providing a plurality of secondary windings on one transformer. It is also possible to provide one or more unregulated outputs.

A feature of the multiple output modification is that it is only necessary to provide a single pair of switching transistors. This is possible because, irrespective of the instantaneous orientation of the output voltage regulating loop, that part of the inverter which actually drives the transformer, in this case the collector-emitter connection of the switching transistors, always undergoes a complete transition from the voltage of one rail to the voltage of the other. Each transformer may thus be subjected to independent regulation of the same type as described above.

Figure 4:
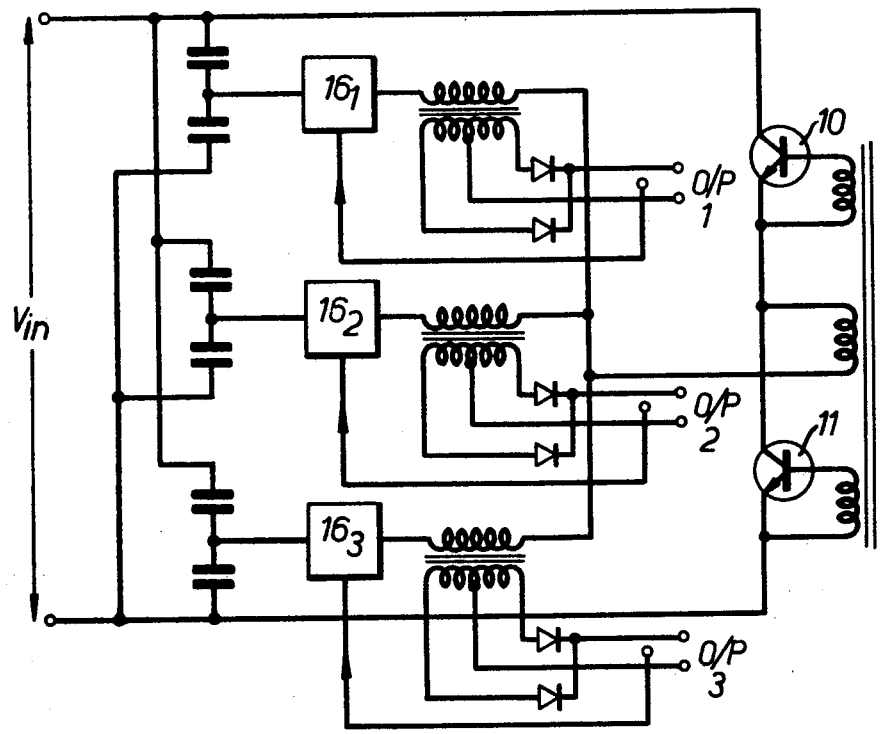
FIGS. 4, 5 and 6 show simplified circuit diagrams of regulated converters.

An embodiment of a power converter with a plurality of independently regulated outputs is shown in FIG. 4. In order to assist understanding of this embodiment, like reference numerals are used for like parts in FIGS. 1 and 4.

From FIG. 4 it will be seen that the two switching transistors 10 and 11 supply three circuits each being similar to that shown in FIG. 1 and each having its own regulating unit which may be as shown in FIG. 2.

Figure 5:
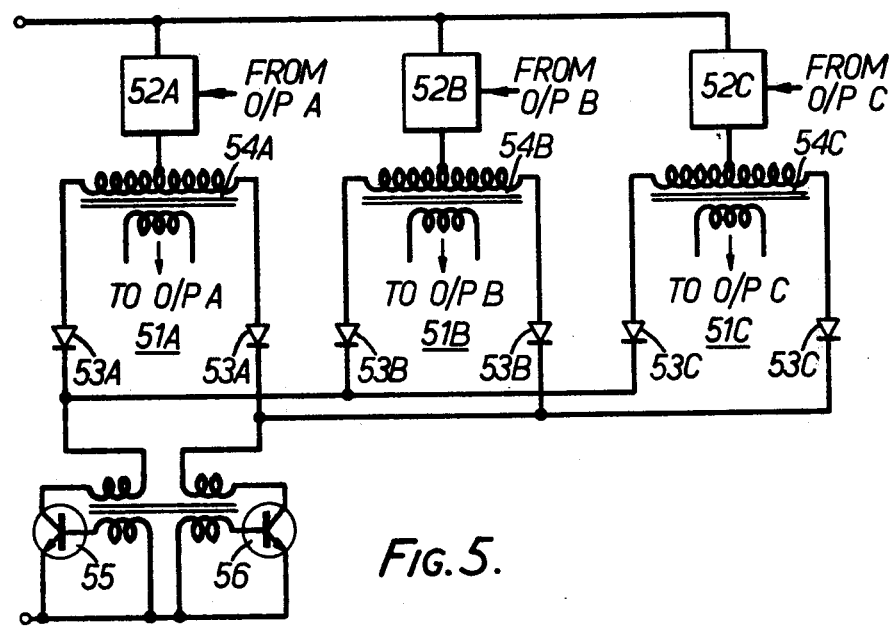

The method of regulation described above can be used with converter circuits other than self-oscillating current feedback inverters. FIG. 5 shows three push-pull inverters 51A, 51B, 51C each provided with its individual regulator 52A, 52B, 52C controlled from its output. A single pair of switching transistors 55,56 are isolated from the primary windings of the inverter transformers 54A, 54B, 54C by diodes 53A, 53B and 53C respectively. It is these diodes 53, which allow the primary winding of each inverter transformer 54 to assume the voltage levels appropriate to its individual controlled supply. Once more, each of the regulators effectively provides a controllable voltage drop in series with the primary winding of the output transformer and may take the form of a conventional linear or switching regulator.

Figure 6:
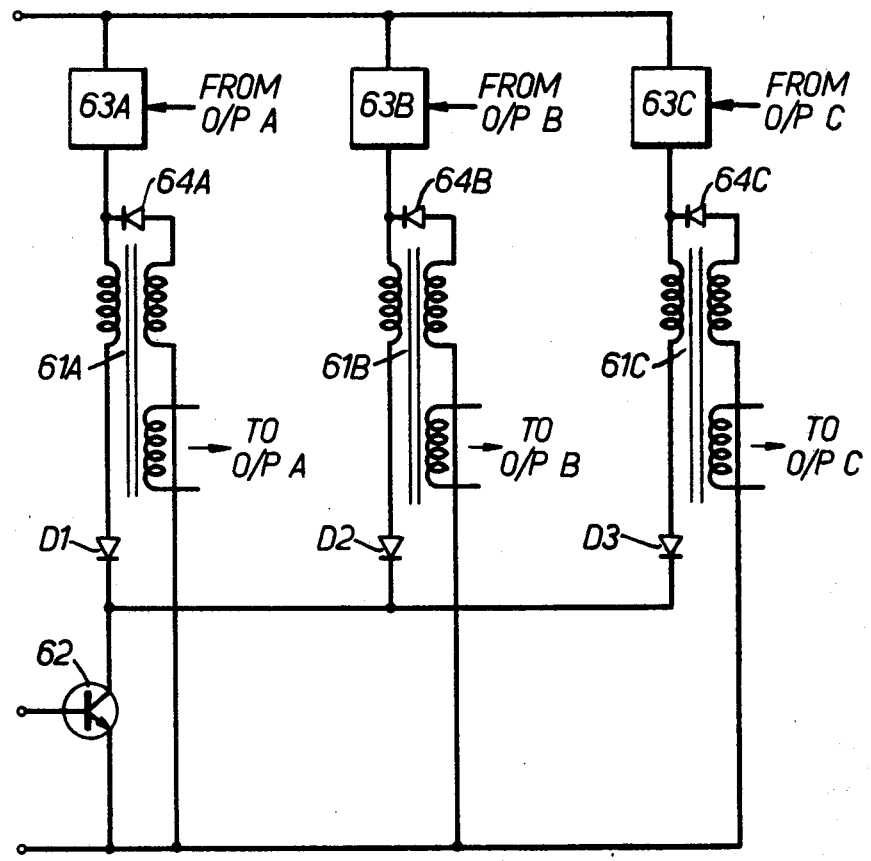

Yet another embodiment of a power converter using a controllable voltage drop in series with the primary winding of an output transformer is shown in FIG. 6. In this embodiment three individually controlled forward converter circuits 61A, 61B, 61C are operated from the same switching transistor 62. The regulating units 63A, 63B and 63C are all similar to that shown in FIG. 2 and are each controlled from the output of their respective transformer. Diodes 64A, 64B, 64C isolate the primary windings of each of the converter circuits so that each can assume the voltage levels appropriate to its individual controlled supply. Once more, each of the regulators effectively provides a controllable voltage drop in series with the primary winding of the output transformer and may take the form of a conventional linear or switching regulator.

An advantage of the method of regulation described in this specification is that because a high frequency waveform of reasonably constant amplitude is always available, the auxiliary voltage rails necessary to drive the regulation unit or units may be derived from a small high frequency transformer rather than a 50Hz transformer.

What we claim is:

1. In a power supply apparatus including a power source, means connected with the power source for producing an oscillatory signal, and inductive coupling means having an input connected with the oscillatory signal producing means, and an output for producing an alternating-current output signal, the improvement which comprises switching regulating means connected in series with the oscillatory signal producing means and the input of the inductive coupling means for producing a controllable voltage drop, said switching regulating means including
   (a) a switching device (21; 55, 56; 62); and
   (b) control means connected with said switching device for controlling the ratio of conducting to non-conducting periods of said switching device, said control means including means responsive to the output signal to control the voltage drop in response to a variation in a parameter of the output signal.

2. Apparatus as defined in claim 1, and further including capacitor means connected between the power source and the swiching regulating means, said switching device being operable to control the state of charge on said capacitor means, thereby to produce said voltage drop.

3. Apparatus as defined in claim 2, wherein said switching regulating means further includes inductive filtering means (22) connected between said switching device and said capacitor means.

4. Apparatus according to claim 2, wherein the oscillatory signal producing means comprises a self-oscillating inverter, and the power source comprises a source of direct current, said self-oscillating inverter including an inverter transformer having a primary winding and a pair of secondary windings, said secondary windings each being connected with a pair of switching means, respectively, said switching means being connected together in series across the power source, the primary winding of said inverter transformer having one end connected with the junction between said pair of switching means, the other end of said primary winding being connected with the input of the inductive coupling means; and further wherein the capacitor means comprises a pair of capacitors, each of said capacitors being connected between an associated terminal of the power source and said switching regulating means, respectively.

5. Apparatus as defined in claim 4, and further including a plurality of inductive coupling means each having an input connected with said other end of said inverter transformer primary winding, and an output for producing a respective alternating signal; a plurality of capacitor means corresponding to said plurality of inductive coupling means, and a plurality of switching regulating means associated with inductive coupling means, respectively, each of said regulating means being connected between a respective inductive coupling means and a respective capacitor means.

6. Apparatus as defined in claim 1, and further including a plurality of inductive coupling means each having an input connected with the oscillatory signal producing means and an output for producing a respective alternating-current output signal, and a plurality of said switching regulating means ($16_1$, $16_2$, $16_3$) associated with said inductive coupling means, respectively, said switching regulating means being connected in series with said oscillatory signal producing means and with the inputs of the inductive coupling means, respectively, the control means of each of said switching regulating means being responsive to the alternating-current output signal derived from the output of its associated inductive coupling means, respectively.

7. Apparatus as defined in claim 1, wherein the inductive coupling means comprises a coupling transformer (12) having primary (12a9 and secondary (12b) windings defining said input and said output, respectively, the switching regulating means (21) being connected in series with said primary winding.

8. Apparatus according to claim 1, wherein the oscillatory signal producing means comprises a push-pull oscillator including an inverter transformer having two primary and two secondary windings; a pair of switching means driven by said primary winding, respectively, the inputs of said inductive coupling means being connected with said pair of switching means via respective ones of said inverter transformer secondary windings, said switching regulating means being connected in series with said push-pull oscillator, the input of said inductive coupling means, and said power source.

9. Apparatus as defined in claim 8, and further including a plurality of inductive coupling means and a plurality of switching regulating means associated with said inductive coupling means, respectively, the inputs of said inductive coupling means being connected with said inverter transformer secondary windings via rectifier means, respectively, thereby isolating each inductive coupling means from the remainder, the control means of each switching regulating means being responsive to the alternating-current output signal derived from the output of its respective inductive coupling means.

10. Power supply apparatus, comprising
(a) a direct-current voltage source including a pair of terminals;
(b) means (10, 11) connected with said source for producing an oscillatory signal;
(c) coupling transformer means (12) including a primary winding (12a) connected at one end with said oscillatory signal producing means, and a secondary winding (12b) for producing an alternating-current output signal;
(d) a pair of capacitors (17, 18) having first ends connected with the terminals of said voltage source, respectively;
(e) switching regulating means (16) for producing a controllable voltage drop, said switching regulating means including
 (1) a switching device (21) including a pair of power circuit electrodes and a control electrode;
 (2) first and second reverse-biased diodes (27, 28) connecting said power circuit electrodes with the source terminals, respectively;
(f) inductive filtering means (22) including first and second windings having first ends connected with the power circuit electrodes of said switching device, respectively, the other ends of said first and second windings being connected with the other ends of said capacitors, respectively; and
(g) third and fourth reverse-biased diodes (25, 26) each connected at one end with the other end of said coupling transformer primary winding, the other ends of said third and fourth diodes being connected with said power circuit electrodes, respectively;
(h) said switching regulating means also including control means (31-33) connected with the control electrode of said switching device for controlling the ratio of the conducting to non-conducting periods of said switching device to produce a voltage drop in the coupling transformer primary winding in response to a change in a parameter of the alternating-current output signal.

* * * * *